United States Patent [19]

Fox et al.

[11] Patent Number: 4,585,851

[45] Date of Patent: Apr. 29, 1986

[54] PROCESS FOR PREPARING POLYESTERS AND POLYESTERCARBONATES POLYMERS WHICH ARE ADAPTABLE FOR WIRE ENAMELS

[75] Inventors: Daniel W. Fox, Pittsfield, Mass.; John J. Keane, Ballston Lake, N.Y.

[73] Assignee: General Electric Company, Waterford, N.Y.

[21] Appl. No.: 583,511

[22] Filed: Feb. 24, 1984

Related U.S. Application Data

[62] Division of Ser. No. 276,916, Jun. 24, 1981, Pat. No. 4,452,278.

[51] Int. Cl.$^4$ .................... C08G 63/18; C08G 63/64
[52] U.S. Cl. .................... 528/176; 528/190; 528/191; 528/193; 528/194; 528/196
[58] Field of Search .............. 528/176, 194, 190, 191, 528/193, 196

[56] References Cited

U.S. PATENT DOCUMENTS

| 3,413,379 | 11/1968 | Schade et al. | 528/194 |
| 3,972,852 | 8/1976 | Inata et al. | 528/194 |
| 4,319,017 | 3/1982 | Kosanovich et al. | 528/194 |

FOREIGN PATENT DOCUMENTS

| 750074 | 10/1970 | Belgium | 528/194 |

*Primary Examiner*—Lester L. Lee

[57] ABSTRACT

A method of preparing a polyester resin by polymerizing a mixture of a diaryl terephthalate, a diaryl isophthalate or mixture thereof, a diphenol and a triaryl mellitate.

1 Claim, No Drawings

PROCESS FOR PREPARING POLYESTERS AND POLYESTERCARBONATES POLYMERS WHICH ARE ADAPTABLE FOR WIRE ENAMELS

This application is a division of application Ser. No. 276,916, filed 6/24/81, now U.S. Pat. No. 4,452,278.

BACKGROUND OF THE INVENTION

It has been proposed to prepare polyesters from lower dialkyl esters of terephthalic and isophthalic acid, ethylene glycol, and a higher polyfunctional alcohol such as glycerine, for use as an electrical insulating material (see U.S. Pat. No. 2,926,296 issued May 10, 1960).

It has also been proposed to prepare polyester-polyimides for use as a wire enamel (U.S. Pat. No. 3,426,098, issued Feb. 4, 1969). According to the latter patent the polyester/polyimide is prepared from (1) tris(2-hydroxy-ethyl)isocyanurate, (2) terephthalic or isophthalic acid or the lower alkyl esters thereof, (3) an aromatic diamine, e.g., oxydianiline, or methylene dianiline, and (4) an aromatic carboxylic acid anhydride containing at least one additional carboxyl group, e.g., trimellitic anhydride or pyromellitic anhyride. See also U.S. Pat. No. 4,107,355.

While it is well known that polymers useful for wire enamels can be made by reacting aliphatic diols and polyols with aromatic polycarboxylic acids or their alkyl esters, there has been lacking up to the present time, a practical synthesis for incorporating an aromatic nucleus as the backbone of the polyol constituent. Attempts to substitute an aromatic polyol, such as Bisphenol A, for the aliphatic diol in the synthesis mentioned above have met with little or no success.

We have now discovered that the desirable properties possessed by an aromatic polyol, such as Bisphenol A, can be incorporated into a polymer backbone, by reacting an aromatic ester of an aromatic dicarboxylic acid directly with the desired aromatic polyol, such as Bisphenol A. In such reaction, the phenol forming the aromatic ester is smoothly eliminated, as a by-product and the desired reaction is carried out easily to completion.

SUMMARY OF THE INVENTION

Thus, according to the present invention there are provided polyesters, polyester/polyamides and polyester/polyamide/polyimide polymers which furnish wire enamel coatings of higher heat resistance and a smoother surface which are superior to present enamel coatings.

According to one embodiment of the subject invention, aromatic ester of a dicarboxylic acid such as diaryl terephthalate or diaryl isophthalate or mixtures thereof, for example, diphenyl terephthalate or diphenyl isophthalate is reacted with an aromatic polyol, such as bisphenol A, bisphenol F, resorcinol, phloroglucinol, mesitol, and the like. The aromatic polyol starting materials must have di-functionality, and, for curability they can contain at least some tri or higher functionality. Suitable are phloroglucinol, pyrogallol, tri- and tetrahydroxy-biphenyl or napthalene, and molecular-weight novolac resin.

By reacting the aromatic esters of the dicarboxylic acid with mixtures or combinations of aromatic polyols and amines there are obtained polyester/polyamide/polyimide polymers. Tri (or higher)-functionality at least in part is also essential for curing here too.

If in place of the aromatic ester of dicarboxylic acids there is substituted BPADA (the reaction product of bisphenol A and phthalic anhydride), polymers with an aromatic ether functionality are obtained.

DESCRIPTION OF THE INVENTION

To form the polymers of the subject invention, there is heated at an elevated temperature, (for example, at about 200° C. to about 270° for about 2 hours to about 7 hours, at a pressure of about one atmosphere) (a) a diaryl terephthalate or diaryl isophthalate or mixtures thereof with (b) the aromatic polyol component, for example a polyhydric phenol and THEIC, or a mixture of (b) and (c) an aromatic diamine, or with a mixture of (b) and (c) and (d) a triaryl mellitate, or a copolycarbonate of any of the foregoing including units derived from (e) a diaryl carbonate.

When the reaction is carried with (b), polyesters are obtained. When the reaction is carried out with a mixture of (b) and (c) polyester/amide and polyester/amide/imide polymers are obtained. Of course, a trifunctional compound, like (d) a triaryl mellitate is needed for the imides.

The compositions employed in the present invention may be described in terms of "equivalent percent." This term can be defined as follows:

The term "equivalent" as used in the present application refers to the number of moles of a substance multiplied by the number of functional groups present in the structure. Thus, the number of equivalents of diphenyl terephthalate in a quantity of diphenyl terephthalate is the number of moles of diphenyl terephthalate present times two. The number of equivalents of bisphenol A present in a given quantity of bisphenol A is the number of moles of bisphenol A present in the quantity multiplied by two. The number of equivalents of the aromatic diamine present in a given quantity of the diamine is the number of moles of the aromatic diamine present in the quantity multiplied by two. The term "equivalent percent" as used in the present application refers to the number of equivalents of a particular reactant divided by the total number of equivalents of all reactants times one hundred.

As is conventional in the prior art, the equivalent ratio of hydroxyl group to carboxyl groups in the starting products to produce the ester resins should amount to between 1.6 and 2.5. This equivalent ratio preferably amounts to at least about 1.8. The upper limit is preferably at 2.3.

The aryl esters of carboxyl groups used for calculating the equivalent ratio of hydroxyl group to carboxyl groups are only those (optionally esterified, i.e., potential) carboxyl groups of the carboxylic acids which are still available for a transesterification reaction with the polyol component for for an ester/amide interchange for the reaction with the polyamines used for this purpose.

Conventional transesterification catalysts can be used, e.g., zinc acetate, antimony trioxide, lithium hydroxide metal amine complex catalysts and the like, at amounts of, for example, 0.001 to 8% by weight based on the weight of the composition.

The term "functional group" as used in the present application refers to a carboxyl group (—COOH), an ester group (—COOR) where R stands for aryl, a hydroxyl group (—OH), or an amino group (—NH$_2$).

As examples of diaryl terephthalates and isophthalates it is preferable to employ diphenyl terephthalate and diphenyl isophthalate.

As aromatic polyols it is preferable to employ for example, such polyhydric phenols as bisphenol A, bisphenol F, resorcinol, phloroglucinol, and tris- or higher poly-phenols such as novolac resins.

Examples of preferred aromatic diamines are methylene dianiline and oxydianiline. Other examples are 3,3'-diaminodiphenyl, 4,4'-diaminodiphenyl, diaminodiphenyl ketone and diaminodiphenyl sulfone.

As a polyimide forming component it is preferable to employ a triaryl mellitate, such as triphenyl mellitate.

As a polycarbonate forming component it is preferable to employ a diaryl carbonate, such as diphenyl carbonate.

The polyesters or polyester/polyamides comprising the subject invention are used as a wire enamel. They are preferably employed in a solvent system. Any suitable solvent can be employed, a preferred example being cresylic acid or N-methylpyrrolidone. They are used to insulate an electrical conductor, for example copper, silver, aluminum or stainless steel wire in conventional fashion. Thus wire speeds of 18 to 40 feet/min. can be used with wire tower temperatures of 240° to 440° C., usually with a final temperature of about 400° C. The build up of enamel on the wire can be 0.001 to 0.010 of an inch and in normal practice about 0.003 of an inch.

The subject invention is further described in examples which follow. These examples are given by way of illustration only and are not to be construed as limitations thereof. Many variations are possible without departing from its spirit and scope.

The results of actual wire coating tests using wire enamels of the types set forth in the following examples are shown below.

The electrical conductor being coated is a copper magnet wire 0.0403 inch in diameter, the coating then being cured in a 15 foot tall gas fired tower having a bottom temperature of 245° C. and a top temperature of 400° C. The wire after coating and curing is visually inspected for smoothness and tested for burnout, which is an indication of the resistance to high temperature in the winding of a stalled motor. Such tests are well known to those skilled in the art and are described, for example, in U.S. Pat. Nos. 2,936,296; 3,297,785; and 3,555,113, and elsewhere. The dissipation factor (D.F.) is carried out by immersing a bent section of coated wire in a molten metal bath and measuring to 60 to 1,000 hertz by means of a General Radio Bridge, or its equivalent, connected to the specimen and the bath. The values are expressed in unit of % at the specified temperature in degrees Centigrade (Reference National Electrical Manufacturers Association Publ. No. MW 1000 Part 3, paragraph 9.1.1). Cut through temperature is carried out by positioning two lengths of wire at right angles, loading one with a weight and raising the temperature until thermoplastic flow causes an electric short and the values are expressed in units comprising degrees Centigrade at 2,000 g. (References NEMA method 50.1.1). Dielectric strength is determined on twisted specimens to which are applied 60 hertz voltage until breakdown occurs. The breakdown voltage is measured with ameter calibrated in root-mean-square volts. The values are expressed in units comprising kilovolts (kv) (Reference NEMA Method 7.1.1).

EXAMPLE 1

The following mixture is introduced in a reaction vessel to prepare a polyester resin:
0.4403 moles (140 grams) of diphenyl terephthalate;
0.1887 moles (60 grams) of diphenyl isophthalate;
0.0699 moles (30.6 grams) of triphenyl trimellitate;
0.0143 moles (3.05 grams) of diphenyl carbonate; and
0.6860 moles (156.4 grams) of bisphenol A The mixture is slowly heated at a temperature ranging from about 120° C. to about 180° C. until the reactants are melted. At this point 34.3 μL of a 0.1M solution of lithium hydroxide is added as a catalyst and the mixture heated at a temperature of from about 200° C. to about 230° C. under variable pressure for about 4 to about 7 hours. The resulting resin is then isolated and cooled.

In preparing a preferred wire enamel composition in accordance with the present invention, the polyester resin is dissolved in cresylic acid in the proportion of about 35% of resin to about 65% of cresylic acid at a temperature of from about 140° C. to about 150° C.

After the resin is completely dissolved the resulting solution is cooled to about 90° C. and 7.5 grams of a blocked polyisocyanate (Mondur SH) is added. This solution is then further cooled to about 50° C. at which point 3.75 grams of tetra isopropyl titanate dissolved in 10 grams of cresylic acid is added.

The resulting enamel is then coated on wire, for example, by the die application procedure using No. 18 AWG copper wire and passing the coated wire 7 times through a 15 foot vertical wire tower, to prepare a sample suitable for testing. The test results are as follows:

TABLE 1

| Polyester Wire Properties of Enamel Comprising Diphenyl Terephthalate, Diphenyl Isophthalate, Bisphenol-A, Triphenyl Trimellitate and Diphenyl Carbonate. | |
|---|---|
| Speed (ft/min.) | 40 |
| Dissipation factor 170° C. | 1.4 |
| 220° C. | 4.1 |
| Cut Thru °C., 2000g | 331 |
| Burnout OFM | 7.12 |
| Dielectric Strength, KV | 2.4 |

The wire was exceptional in its cut through and burnout resistance.

EXAMPLE 2

The following mixture is introduced in a reaction vessel to prepare a polyester amide/imide resin:
0.629 moles (200 grams) of diphenyl terephthalate;
0.343 moles (150.3 grams) of triphenyl trimellitate;
0.265 moles (52.5 grams) of methylene dianiline;
0.0223 moles (4.9 grams) of diphenyl carbonate; and
0.8163 moles (186.1 grams) of bisphenol A The procedure is the same as in Example 1, except 41 μL of a 0.1M solution of lithium hydroxide is added as a catalyst.

In preparing a wire enamel composition in accordance with the present invention, the polyester amide/imide resin is dissolved in N-methylpyrrolidone (NMP) in the proportion of about 29% resin to about 71% of NMP at a temperature of from about 140° C. to about 150° C.

After the resin is completely dissolved the resulting solution is cooled to about 90° C. and 8.6 grams of blocked polyisocyanate (Mondur SH) is added. This solution is then further cooled to about 50° C. at which point 4.3 grams of tetra isopropyl titanate dissolved in 10 grams of NMP is added.

The resulting polymer is then applied as an enamel on a wire as described in Example 1. The tests results are as follows:

TABLE 2

Polyester Amide/Imide Wire
Properties of Enamel Comprising Diphenyl Terephthalate,
Triphenyl Trimellitate, Methylene Dianiline,
Bisphenol-A, and Diphenyl Carbonate.

| | |
|---|---|
| Speed (ft/min.) | 40 |
| Dissipation Factor 220° C. | 4.6 |
| Cut Thru °C., 2000 g | 372 |
| Burnout OFM | 8.90 |
| Dielectric Strength, KV | 6.5 |

The coated wire exhibited good cut through an burnout.

The patents mentioned above are incorporated herein by reference. The foregoing detailed description will support many variations to those skilled in this art. All such variations are within the full scope of the appended claims.

We claim:

1. A process for making a polyester resin which consists essentially of heating, at a temperature of from about 200° C. to about 270° C. for a period of at least about 2 hours, a mixture consisting essentially of:
   a. a diaryl terephthalate;
   b. a diaryl isophthalate; or
   c. mixtures of a and b above;
   d. a diphenol; and
   e. a triaryl mellitate with or without the presence of a diaryl carbonate to provide a copoly carbonate of the polyester.

* * * * *